US012321972B2

(12) United States Patent
Bender et al.

(10) Patent No.: US 12,321,972 B2
(45) Date of Patent: *Jun. 3, 2025

(54) QUERY REFORMULATIONS FOR AN ITEM GRAPH

(71) Applicant: Maplebear Inc., San Francisco, CA (US)

(72) Inventors: Jonathan Lennart Bender, San Francisco, CA (US); Tyler Russell Tate, Lexington, KY (US); Tejaswi Tenneti, San Carlos, CA (US); Aditya Subramanian, San Francisco, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/420,594

(22) Filed: Jan. 23, 2024

(65) Prior Publication Data

US 2024/0161163 A1    May 16, 2024

Related U.S. Application Data

(63) Continuation of application No. 17/188,214, filed on Mar. 1, 2021, now Pat. No. 11,915,289.

(51) Int. Cl.
*G06Q 30/00* (2023.01)
*G06F 16/901* (2019.01)
(Continued)

(52) U.S. Cl.
CPC ..... *G06Q 30/0625* (2013.01); *G06F 16/9024* (2019.01); *G06F 17/18* (2013.01)

(58) Field of Classification Search
CPC .. G06Q 30/0625; G06F 16/9024; G06F 17/18
See application file for complete search history.

(56) References Cited

U.S. PATENT DOCUMENTS

| 8,982,129 B1* | 3/2015 | Broekhuijsen ...... G06F 16/9024 707/736 |
| 2013/0218899 A1* | 8/2013 | Raghavan ........... G06F 16/9024 707/E17.083 |
| 2019/0236740 A1* | 8/2019 | Rao .................. G06Q 10/06315 |

OTHER PUBLICATIONS

Pradhan, N. et al. "Islands of interest: Mining concentrations of user search intent over e-commerce product categories," *IEEE International Conference on Big Data*, Dec. 10, 2018, pp. 3717-3722.
(Continued)

*Primary Examiner* — Anand Loharikar
(74) *Attorney, Agent, or Firm* — Fenwick & West LLP

(57) ABSTRACT

An online concierge system generates an item graph connecting item nodes with attribute nodes of the items. When the online concierge system receives a search query to identify one or more items from a customer, the online concierge system parses the search query into combinations of terms and identifies item nodes and attribute nodes related to the search query. The online concierge system may determine that no item nodes meet presentation criteria. The online concierge system may determine that a reformulated search query has a higher conversion probability than the search query received from the customer. The online concierge system reformulates the search query. The online concierge system selects item nodes as search results. The online concierge system transmits the search results to the customer.

20 Claims, 6 Drawing Sheets

(51) Int. Cl.
*G06F 17/18* (2006.01)
*G06Q 30/0601* (2023.01)

(56) References Cited

OTHER PUBLICATIONS

United States Office Action, U.S. Appl. No. 17/188,214, filed Jul. 10, 2023, 12 pages.
United States Office Action, U.S. Appl. No. 17/188,214, filed Dec. 22, 2022, 13 pages.

* cited by examiner

QUERY REFORMULATIONS FOR AN ITEM GRAPH

CROSS REFERENCE TO RELATED APPLICATIONS

This application is a continuation of co-pending U.S. application Ser. No. 17/188,214, filed Mar. 1, 2021, which is incorporated by reference in its entirety.

BACKGROUND

This disclosure relates generally to ordering an item through an online concierge system, and more specifically to reformulating search queries for an item graph maintained by the online concierge system.

In current online concierge systems, shoppers (or "pickers") fulfill orders at a physical warehouse, such as a retailer, on behalf of customers as part of an online shopping concierge service. An online concierge system provides an interface to a customer identifying items offered by a physical warehouse and receives selections of one or more items for an order from the customer. In current online concierge systems, the shoppers may be sent to various warehouses with instructions to fulfill orders for items, and the shoppers then find the items included in the customer order in a warehouse.

When generating the interface to a consumer from which the consumer selects one or more items, the online concierge system receives information identifying items offered by a warehouse from the warehouse and generates the interface from the information received from the warehouse. The online concierge system may categorize the items identified by the warehouse from the received information and use the categorization when generating the interface. For example, the online concierge system leverages information from the warehouse describing items offered by the warehouse so the items are categorized to replicate their placement in aisles within the warehouse.

However, when a customer provides a search query to the online concierge system, terms in the search query may map to a node in an item graph that is not available for purchase. Similarly, the search query may not accurately or fully map to terms describing items desired by the customer. The online concierge system typically provides a list of items to the customer which the online concierge system determines are a best fit to the search query. In the preceding examples, without receiving specific search terms that map to an available product, an online concierge system is unable to efficiently steer the customer to an item which the customer ultimately may purchase.

SUMMARY

An online concierge system may receive a search query from a customer through an ordering interface. The search query includes one or more search terms for identifying one or more items the customer seeks to purchase via the online concierge system. For example, the online concierge system receives a selection of a warehouse for fulfilling an order from the customer and then receives a search query to identify one or more items offered by the selected warehouse.

To identify items matching one or more of the search terms included in the search query, the online concierge system retrieves an item graph stored by the online concierge system. The item graph comprises a plurality of nodes, with each node corresponding to an item available through the online concierge system or corresponding to an attribute of an item available through the online concierge system.

The nodes in the graph may be organized in a hierarchical taxonomy. Higher orders in the taxonomy represent broader categories of items, with lower orders representing narrower categories, and lowest orders representing specific items. For example, a "food" attribute node may be connected to lower level attribute nodes representing "meat," "produce," "dairy," etc., and a lowest order node may represent item nodes for a specific brand and size of an item.

The online concierge system generates a ranking of candidate nodes based on the search query. Based on the ranking, the online concierge system displays search results including one or more candidate items to the customer. For example, the online concierge system selects candidate nodes having at least a threshold position in the ranking and displays candidate items below the selected candidate nodes in the item graph as the search results.

For some search queries, the online concierge system may identify a node that does not have any available items below the node, or the online concierge system may determine that the item graph does not contain a node with a suitable score. The online concierge system may reformulate the search query. The reformulated search query may comprise search terms that are broader than the search terms in the original search query. The reformulated search query may map to an attribute node connected to, and at a higher hierarchical level than, the identified node. The online system executes the reformulated search query and selects search results for the reformulated search query.

The online concierge system displays items corresponding to the item nodes as search results. In response to the user selecting an item, the online concierge system allows the user to place an order for the specific item.

In some embodiments, a method may comprise receiving, at an online concierge system, a search query including one or more search terms from a customer. The online concierge system may retrieve an item graph comprising item nodes and attribute nodes, wherein each attribute node is connected to a set of item nodes that share an attribute represented by the attribute node. The online concierge system may segment the search query into tokens, each token comprising one or more of the search terms. The online concierge system may identify candidate nodes from the item graph by comparing the tokens to the item graph. The online concierge system may determine that none of the identified candidate nodes meet presentation criteria. The online concierge system may reformulate the search query using a query reformulation model. The online concierge system may select search results from the item graph comprising one or more item nodes based on the reformulated search query. The online system may transmit the search results to a customer device.

In some embodiments, a method may comprise receiving, at an online concierge system, a search query including one or more search terms from a customer. The online concierge system may retrieve an item graph comprising item nodes and attribute nodes, wherein each attribute node is connected to a set of item nodes that share an attribute represented by the attribute node. The online concierge system may segment the search query into tokens, each token comprising one or more of the search terms. The online concierge system may identify candidate nodes from the item graph by comparing the tokens to the item graph. The online concierge system may calculate a conversion probability for the search query received from the customer. The online concierge system may calculate a conversion probability for a reformulated search query. The online concierge system may reformulate, in response to the conversion probability for the reformulated search query being greater than the conversion probability for the search query received from the customer, the search query. The online concierge system may select search results from the item graph comprising one or more item nodes based on the reformulated search query. The online system may transmit the search results to a customer device.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
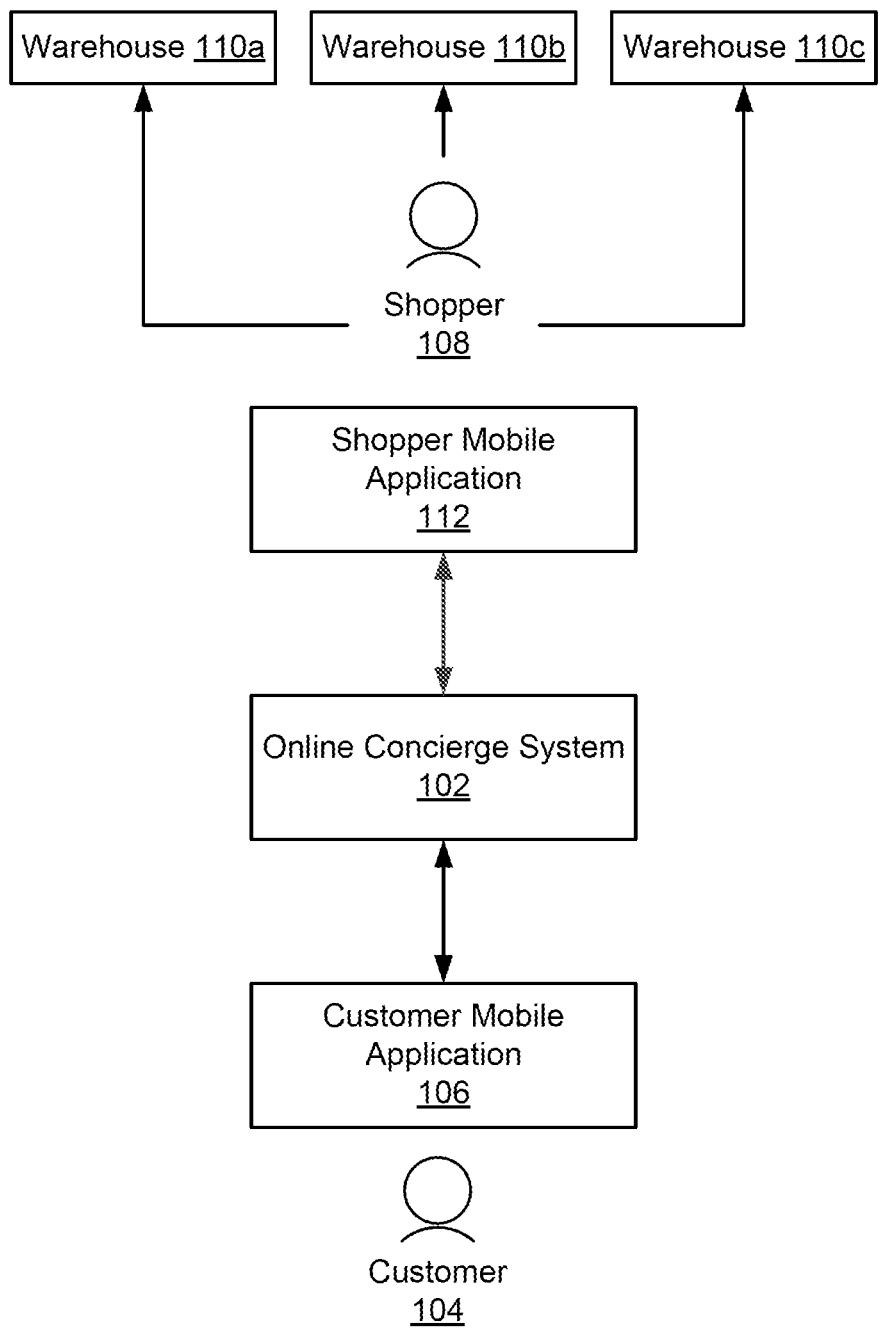
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In various embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more shoppers 108. A shopper 108 may be a contractor, employee, or other person (or entity) who is enabled to fulfill orders received by the online concierge system 102. The shopper 108 travels between a warehouse and a delivery location (e.g., the customer's home or office). A shopper 108 may travel by car, truck, bicycle, scooter, foot, or other mode of transportation. In various embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to customers. Each shopper 108 fulfills an order received from the online concierge system 102 at one or more warehouses 110, delivers the order to the customer 104, or performs both fulfillment and delivery. In one embodiment, shoppers 108 make use of a shopper mobile application 112 which is configured to interact with the online concierge system 102.

Figure 2:
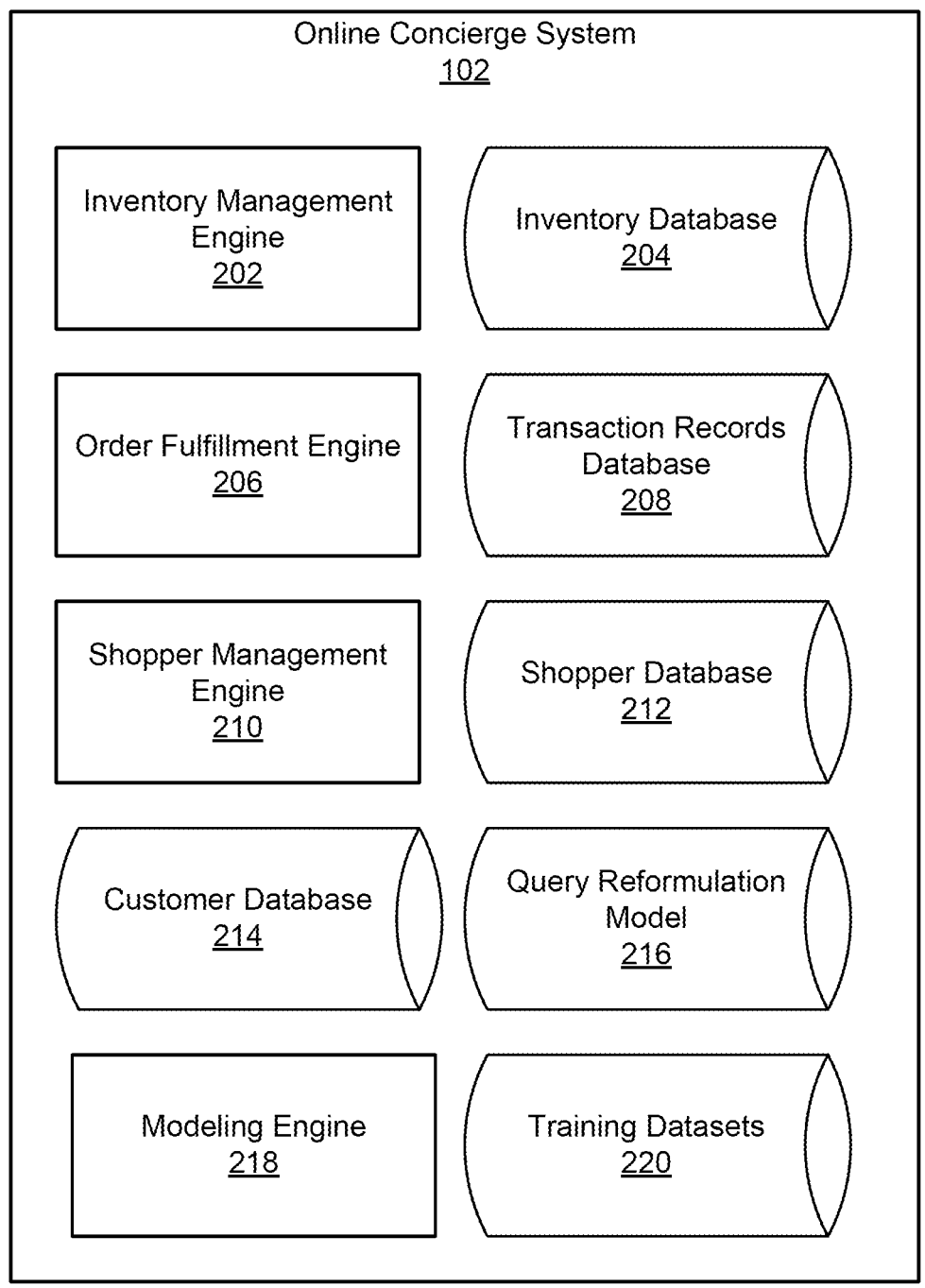
FIG. 2 is a diagram of an online shopping concierge system, according to one embodiment.

FIG. 2 is a diagram of an online concierge system 102, according to one embodiment. The online concierge system 102 includes an inventory management engine 202, which interacts with inventory systems associated with each warehouse 110. In one embodiment, the inventory management engine 202 requests and receives inventory information maintained by the warehouse 110. The inventory of each warehouse 110 is unique and may change over time. The inventory management engine 202 monitors changes in inventory for each participating warehouse 110. The inventory management engine 202 is also configured to store inventory records in an inventory database 204. The inventory database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the inventory database 204 also stores purchasing rules associated with each item, if they exist. For example, age-restricted items such as alcohol and tobacco are flagged accordingly in the inventory database 204. Additional inventory information useful for predicting the availability of items may also be stored in the inventory database 204. For example, for each item-warehouse combination (a particular item at a particular warehouse), the inventory database 204 may store a time that the item was last found, a time that the item was last not found (a shopper looked for the item but could not find it), the rate at which the item is found, and the popularity of the item.

Inventory information provided by the inventory management engine 202 may supplement the training datasets 220. Inventory information provided by the inventory management engine 202 may not necessarily include information about the outcome of picking a delivery order associated with the item, whereas the data within the training datasets 220 is structured to include an outcome of picking a delivery order (e.g., if the item in an order was picked or not picked).

The online concierge system 102 also includes an order fulfillment engine 206 which is configured to synthesize and display an ordering interface to each customer 104 (for example, via the customer mobile application 106). The order fulfillment engine 206 is also configured to access the inventory database 204 in order to determine which products are available at which warehouse 110. The order fulfillment engine 206 determines a sale price for each item ordered by a customer 104. Prices set by the order fulfillment engine 206 may or may not be identical to in-store prices determined by retailers (which is the price that customers 104 and shoppers 108 would pay at the retail warehouses). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In various embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a warehouse selected by a customer 104, a probability of item availability determined by a query reformulation model 216, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the customer 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a customer database 214 which stores information describing each customer. This information could include each customer's name, address, gender, shopping preferences, favorite items, stored payment instruments, and so on.

In various embodiments, the order fulfillment engine 206 generates and maintains an item graph, further described below in conjunction with FIGS. 4 and 5. The item graph identifies connections between pairs of items and attributes of items and between pairs of attributes of items. The item graph comprises a hierarchical taxonomy of nodes. A connection between an item node and an attribute node indicates that the item has the attribute to which the item is connected. The attributes of an item may be specified by information describing the product from a warehouse 110 providing the item or determined by the order fulfillment engine 206 based on information about the item received from the warehouse 110. A connection between an attribute node and an additional attribute node may indicate a parent-child relationship between the attribute nodes. For example, an attribute node for a broad category (e.g., "meat") may be connected to a child attribute node (e.g., "pork") that is a subset of the parent attribute node. In various embodiments, a connection between an attribute node and an additional attribute node may indicate that the attribute and the additional attribute have both occurred in one or more previously received orders for items. For example, the attribute node is connected to the additional attribute node if a previously received order included an item having the attribute and having another item having the additional attribute. Similarly, the attribute node is connected to the additional attribute if a previously received order included an item having both the attribute and having the other attribute. As further described below in conjunction with FIG. 4, the order fulfillment engine 206 uses the item graph to generate search results of items in response to a search query received from a customer 104, allowing the order fulfillment engine 206 to leverage information about different attributes and items to increase a likelihood of identifying items that at least partially match the search query for inclusion in an order.

Machine Learning Model

The online concierge system 102 further includes a query reformulation model 216, a modeling engine 218, and training datasets 220. The modeling engine 218 uses the training datasets 220 to generate the query reformulation model 216. The query reformulation model 216 can learn from the training datasets 220, rather than follow only explicitly programmed instructions. The inventory management engine 202, order fulfillment engine 206, and/or shopper management engine 210 can use the query reformulation model 216 to determine a probability of a purchase for search results being displayed to a customer in response to a reformulated search query based on a customer's search query. A single query reformulation model 216 is used to predict the conversion probability of any number of items.

The query reformulation model 216 can be configured to receive inputs including information about an item, previous purchases of the item, previous search terms entered by customers, subsequent search terms entered by consumers, previous query reformulations, and the popularity of the item. The query reformulation model 216 may be adapted to receive any information that the modeling engine 218 identifies as indicators of a conversion. At a minimum, the query reformulation model 216 receives information about an item-query pair, such as an item in a delivery order and a reformulated query that resulted in a conversion. Items stored in the inventory database 204 may be identified by item identifiers. In various embodiments, various attributes, some of which are specific to the warehouse (e.g., a time that the item was last found in the warehouse, a time that the item was last not found in the warehouse, the rate at which the item is found, the popularity of the item), may be stored for each item in the inventory database 204. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. Based on the identifier(s), the online concierge system 102 can extract information about the item and/or warehouse from the inventory database 204 and/or warehouse database and provide this extracted information as inputs to the query reformulation model 216.

The query reformulation model 216 contains a set of functions generated by the modeling engine 218 from the training datasets 220 that relate the item, warehouse, previous purchase information, query information, query reformulation information, and/or any other relevant inputs, to the probability that the customer will purchase the item (also referred to as a conversion probability). Thus, for a given item-query pair, the query reformulation model 216 outputs a probability that the item will be purchased by a customer when displayed to the customer in response to a reformulated search query. The query reformulation model 216 constructs the relationship between the input item-query pair and/or any other inputs and the conversion probability that is generic enough to apply to any number of different item-query pairs. In various embodiments, the conversion probability output by the query reformulation model 216 includes a confidence score. The confidence score may be the error or uncertainty score of the output conversion probability and may be calculated using any standard statistical error measurement. In some examples, the confidence score is based in part on whether the item-query pair conversion prediction was accurate for previous delivery orders (e.g., if the item was predicted to be purchased but did not lead to a conversion, or predicted not to lead to a conversion but was ultimately purchased by the customer). In some examples, the confidence score is based in part on the age of the data for the item, e.g., conversion information received in the last week may be weighted more heavily than conversion information received the previous week. The set of functions of the query reformulation model 216 may be updated and adapted following retraining with new training datasets 220. The query reformulation model 216 may be any machine learning model, such as a neural network, boosted tree, gradient boosted tree or random forest model. In some examples, the query reformulation model 216 is generated from XGBoost algorithm.

The conversion probability generated by the query reformulation model 216 may be used to determine items displayed to the customer 104 in response to a search query, as described in further detail below.

The training datasets 220 relate a variety of different factors to known conversion information from the outcomes of previous delivery orders (e.g. if an item was previously purchased or not purchased after entering a search query). The training datasets 220 include the items included in previous delivery orders, the search terms entered by customers, reformulated search queries, warehouses associated with the previous delivery orders, and a variety of attributes associated with each of the items (which may be obtained from the inventory database 204). Each piece of data in the training datasets 220 includes the outcome of a previous delivery order (e.g., if the item was purchased or not). The item attributes may be determined by the query reformulation model 216 to be statistically significant factors predictive of the item's availability. For different items, the item attributes that are predictors of availability may be different. For example, an item type factor might be the best predictor of conversion for dairy items, whereas a time of day may be the best predictive factor of conversions for pre-made dinners. For each node, the query reformulation model 216 may weight these factors differently, where the weights are a result of a "learning" or training process on the training datasets 220. The training datasets 220 are very large datasets taken across a wide cross section of warehouses, search terms, customers, items, delivery orders, times, and item attributes. The training datasets 220 are large enough to provide a mapping from a reformulated search query to a likelihood that an item will be purchased by the customer. In addition to previous delivery orders, the training datasets 220 may be supplemented by customer profile information provided by the customer database 214.

Each item node or attribute node in the item graph may be connected to multiple higher level attribute nodes. In response to a search query that does not provide results meeting presentation criteria, the query reformulation model 216 may be configured to reformulate the search query to reformulated search terms that are most likely to result in a conversion. The reformulated search terms may be broader than the search terms in the search query input by the customer. The reformulated search terms may map to a higher level node most likely to result in a conversion. The item nodes connected to the higher level node may be presented as search results for the reformulated search query. In some embodiments, the query reformulation model 216 may calculate a probability that a search query entered by a customer will lead to a conversion, calculate a probability that a reformulated search query will lead to a conversion, and in response to the reformulated search query having a higher conversion probability, the query reformulation model 216 may reformulate the search query.

Machine Learning Factors

The training datasets 220 include associations between search terms entered by a customer, subsequent search terms, and conversions resulting from the subsequent search terms. The subsequent search terms may comprise subsequent search terms entered by the customer or a reformulated search query generated by the online concierge system 102. The data in the training datasets 220 is labeled based on whether or not, for initial search terms entered by a customer, subsequent search terms resulted in a conversion to produce a labeled set of training data. The online concierge system 102 trains the query reformulation model 216 using the set of training data. The system applies the model to future search queries to determine a probability of whether a reformulated search query will lead to a conversion.

The training datasets 220 may include search terms that did not return any results and subsequent search terms entered by a customer. The training datasets 220 may indicate whether the subsequent search terms resulted in a conversion. The subsequent search terms may be subsequent search terms entered by a customer or a reformulated search query selected by the query reformulation model 216. For example, if the search terms "crumbled feta cheese" did not provide any results, the training datasets 220 may indicate whether subsequent searches for "crumbled cheese" or "feta cheese" resulted in a conversion. The training datasets 220 may also identify which specific items were purchased in response to the subsequent search terms.

The training datasets 220 may include a time associated with previous delivery orders. In various embodiments, the training datasets 220 include a time of day at which each previous delivery order was placed. Time of day may impact conversion rates, since during different times of day, or different days of the week, customers may skew purchases towards different items. In various embodiments, training datasets 220 include a time interval since an item was previously purchased in a previous delivery order. If an item has recently been purchased at a warehouse, this may increase the probability that future orders may include the item. If there has been a long time interval since an item has been picked, this may indicate that the probability that the item will be purchased in subsequent orders is low. In some examples, training datasets 220 may also include a rate at which an item is typically purchased by a customer, a number of days since the customer last purchased the item, or any number of additional rate or time information. The relationships between this time information and conversion probability are determined by the modeling engine 218 training a machine learning model with the training datasets 220, producing the query reformulation model 216.

The training datasets 220 include item attributes. In some examples, the item attributes include a department associated with the item. For example, if the item is yogurt, it is associated with the dairy department. The department may be the bakery, beverage, nonfood and pharmacy, produce and floral, deli, prepared foods, meat, seafood, dairy, the meat department, or dairy department, or any other categorization of items used by the warehouse. The item attributes may include an item popularity score. The item popularity score for an item may be proportional to the number of delivery orders received that include the item. The item popularity score for an item may be proportional to the number of search queries received for the item. In some examples, the item attributes include a product type associated with the item. For example, if the item is a particular brand of a product, then the product type attribute will be a generic description of the product type, such as "milk" or "eggs." The product type attribute may affect the conversion probability, since certain product types may have a higher reordering rate than others. In some examples, the item attributes may include a total number of delivery orders received for the item, whether or not the product is organic, vegan, gluten free, or any other attributes associated with an item. The relationships between item attributes and conversion probabilities are determined by the modeling engine 218 training a machine learning model with the training datasets 220, producing the query reformulation model 216.

The training datasets 220 may include additional item attributes that affect the conversion probability and can therefore be used to build the query reformulation model 216 relating the node selection for a search query to its predicted conversion probability. The training datasets 220 may be periodically updated with recent previous conversion information. Following updating of the training datasets 220, a modeling engine 218 may retrain a model with the updated training datasets 220 and produce a new query reformulation model 216.

Customer Mobile Application

Figure 3A:
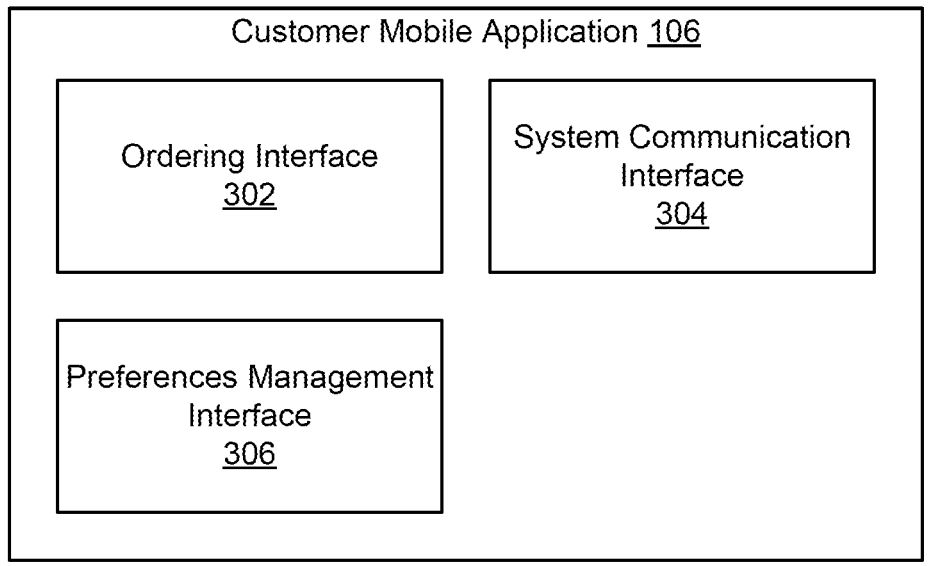
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the customer 104 can browse through and select products and place an order. The ordering interface 302 provides a search query interface for the customer to enter a search query. The ordering interface 302 may display a reformulated query based on the search query entered by the customer. The ordering interface 302 displays items corresponding to item nodes from the item graph as results to the search query. The customer may select an item to order a specific item. The CMA 106 also includes a system communication interface 304 which, among other functions, receives inventory information from the online shopping concierge system 102 and transmits order information to the system 102. The CMA 106 also includes a preferences management interface 306 which allows the customer 104 to manage basic information associated with his/her account, such as his/her home address and payment instruments. The preferences management interface 306 may also allow the customer to manage other details such as his/her favorite or preferred warehouses 110, preferred delivery times, special instructions for delivery, etc.

Shopper Mobile Application

Figure 3B:
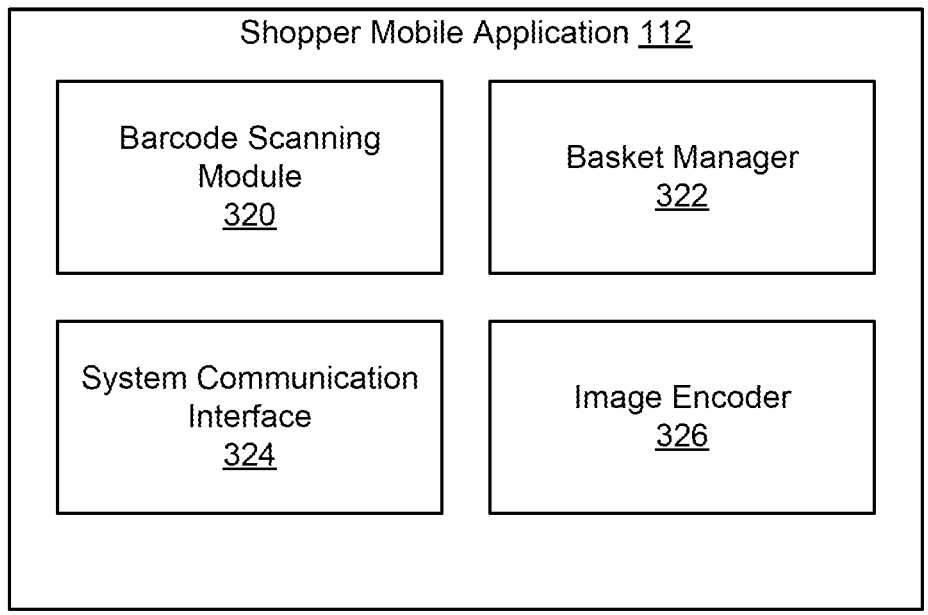
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly. The SMA 112 also includes a system communication interface 324 which interacts with the online shopping concierge system 102. For example, the system communication interface 324 receives an order from the system 102 and transmits the contents of a basket of items to the system 102. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Selecting Nodes for a Received Search Query

Figure 4:
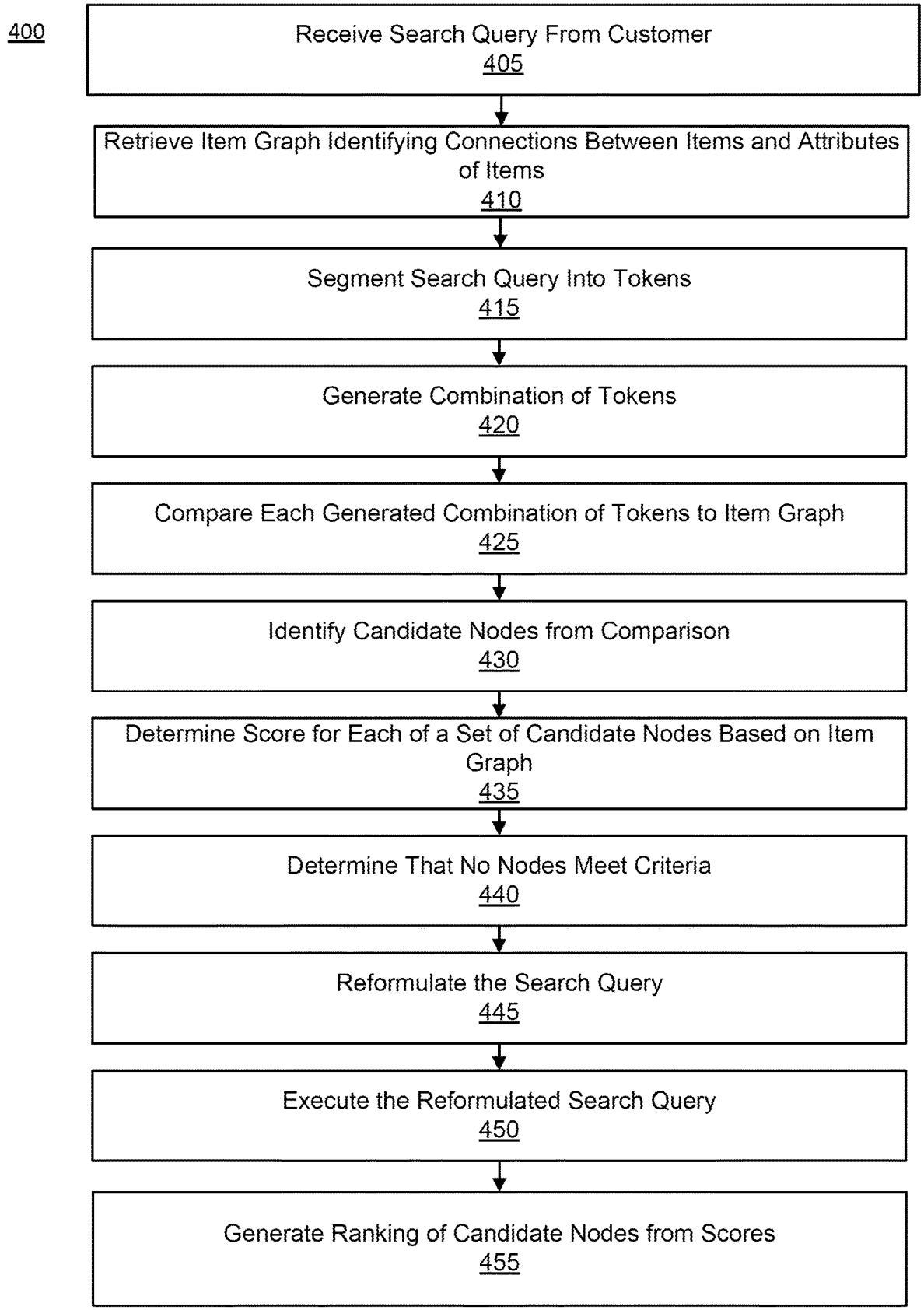
FIG. 4 is a flowchart of a process for reformulating a search query for an item graph, according to one embodiment.

FIG. 4A is a flowchart 400 of one embodiment of a method for selecting one or more nodes in response to a search query received from a customer using an item graph maintained by an online concierge system 102. In various embodiments, the method includes different or additional steps than those described in conjunction with FIG. 4. Further, in various embodiments, the steps of the method may be performed in different orders than the order described in conjunction with FIG. 4. The method described in conjunction with FIG. 4 may be carried out by the online concierge system 102 in various embodiments.

The online concierge system 102 receives 405 a search query from a customer 104 through the CMA 106. The search query includes one or more search terms for identifying one or more items the customer 104 seeks to purchase via the online concierge system 102. For example, the online concierge system 102 receives a selection of a warehouse 110 for fulfilling an order from the customer 104 then receives 405 a search query to identify one or more items offered by the selected warehouse 110.

However, search terms in the received search query may not correspond to specific items offered by the warehouse 110 or may partially identify multiple items offered by the warehouse 110. To identify nodes matching one or more of the search terms included in the search query, the online concierge system 102 retrieves 410 an item graph stored by the online concierge system 102. The item graph comprises a plurality of nodes, with item nodes corresponding to an item available through the online concierge system 102 and attribute nodes corresponding to an attribute of an item available through the online concierge system 102, as further described with respect to FIG. 5.

The online concierge system 102 segments 415 the received search query into tokens, with each token comprising one or more search terms included in the search query. The online concierge system 102 may use any suitable method for segmenting 415 the received search query. For example, the online concierge system 102 identifies one or more specific delimiter characters in the received search query and segments 415 the search terms in the search query into tokens separated by the specific delimiter characters. As an example, a specific delimiter character is a space, so the online concierge system 102 segments 415 the received search query into tokens that are individual words included in the search query, so an example search query of "organic whole milk" is segmented into "organic," "whole," and "milk." Alternatively, the online concierge system 102 maintains a trained machine learned model for segmenting 415 the received search query into tokens and applies the trained machine learned model to the received search query to segment 415 the received search query into tokens.

From the tokens identified from the search query, the online concierge system 102 generates 420 combinations of tokens. In various embodiments, the online concierge system 102 generates each possible combination of tokens from the segmented search query. Alternatively, the online concierge system 102 generates a specific number of different combinations of tokens from the segmented search query. The online concierge system 102 may maintain a parameter identifying the specific number of combinations of tokens that are generated.

The online concierge system 102 compares 425 each generated combination of tokens to nodes in the item graph. When a combination of tokens includes one or more tokens matching an attribute node in the item graph, the online concierge system 102 traverses the item graph using connections between the attribute nodes matching one or more of the tokens in the combination to identify an item node connected to the attribute node matching one or more of the tokens in the combination.

The online concierge system 102 identifies 430 candidate item nodes based on the comparison. Item nodes connected to one or more attribute nodes matching one or more tokens in the combination are identified as candidate item nodes for display as search results.

In various embodiments, the online concierge system 102 stores a mapping between tokens and alternative terms. For example, the mapping associates a token with one or more synonyms for the token. When comparing a combination of tokens to the nodes in the item graph, the online concierge system 102 retrieves synonyms for one or more tokens from the mapping and compares one or more synonyms for a token to nodes in the item graph, allowing the online concierge system 102 to account for variations in how different customers provide search terms for one or more items to the online concierge system 102. In various embodiments, the online concierge system 102 generates the mapping based on search terms previously received from customers and attributes of items that the customers selected for inclusion in orders after receiving search results for the previously received search terms.

The online concierge system 102 accounts for connections between attribute nodes to identify candidate nodes. In various embodiments, the online concierge system 102 determines an additional attribute node connected to the attribute node matching one or more tokens in the combination via the item graph and identifies 430 an item node connected to the additional attribute node as a candidate item node for display.

The online concierge system 102 determines 435 a score for candidate nodes in the item graph. The online concierge system 102 may determine a score for each identified candidate item node or for each of at least a set of the identified candidate item nodes. The online concierge system 102 may also determine a score for candidate attribute nodes in the item graph. In various embodiments, the online concierge system 102 determines the score for a candidate node based on a number of attribute nodes connected to the candidate node that match one or more tokens in the combination. A candidate node connected to a greater number of attribute nodes matching one or more tokens in the combination may have a higher score. The online system 102 may account for a number of connections between the candidate node and attribute nodes matching one or more tokens in the combination. For example, the online concierge system 102 assigns a weight to the attribute node matching one or more tokens in the combination that is inversely related (e.g., inversely proportional) to a number of connections between the candidate node and one or more attribute nodes matching one or more tokens in the combination. The score for the candidate node may be determined by combining the weighted attributes matching one or more tokens of the combination connected to the candidate node. When determining 435 the score for a combination of tokens, the online concierge system 102 may generate a score for the combination based on comparison of different synonyms for tokens in the combination to the item graph, and determine the score for the combination of tokens as a maximum score of the scores determined for different synonyms of the tokens in the combinations. This allows the online concierge system 102 to leverage connections between attribute nodes in the item graph to identify candidate nodes based on a search query, while accounting for distance between candidate nodes and attribute nodes matching one or more tokens in a combination generated from the search query.

When scoring a candidate node, the online concierge system 102 may account for prior actions by customers 104. A connection between an attribute node and a candidate node may include a value based on a number of times or frequency that a search query mapped to the attribute node led to a purchase of the candidate item node. A connection between an attribute node and another attribute node may include a value based on inclusion of an item having the attribute in previously received orders along with one or more other items having the other attribute or inclusion of an item having both the attribute and the additional attribute in received orders. In various embodiments, a weight of a connection between a candidate node and attribute node that is connected to an additional attribute node that matches one or more tokens in the combination is modified based on the value of the connection between the attribute node and the additional attribute node. For example, greater values of the connection between the attribute node and the additional attribute node increase the weight of the connection between the candidate node and the attribute node, while lower values of the connection between the attribute node and the additional attribute node decrease the weight of the connection between the candidate node and the attribute node. This allows the online concierge system 102 to account for prior interactions by customers with items having different attributes when determining relatedness or similarity between the different attribute nodes. As the value of a connection between an attribute node and an additional attribute node may change as the online concierge system 102 receives orders from customers, the similarity between attribute nodes connected to each other in the item graph may be modified over time.

Based on the scoring, the online concierge system 102 determines 440 that there are no candidate item nodes that meet presentation criteria for presentation to the customer. The presentation criteria may be a minimum threshold score for the candidate item node. The presentation criteria may require that the item be available for delivery to the customer. The online concierge system 102 may determine that all candidate item nodes have a score below the threshold score. In some embodiments, the online concierge system 102 may determine that any candidate item nodes that are above the threshold score represent items that are not currently available for delivery to the customer.

The online concierge system 102 reformulates 445 the search query to reformulated search terms most likely to result in a conversion. The online concierge system 102 may reformulate the search query using a query reformulation model, such as the query reformulation model 216 of FIG. 2. The reformulated search terms may be broader than the search terms input by the customer. The reformulated search terms may map to an attribute node at a higher level than the candidate nodes. In some embodiments, the online concierge system 201 may reformulate the search query based in part on the candidate attribute node having the highest score. In some embodiments, the online concierge system 102 may select an attribute node connected to the candidate item node having the highest score. The candidate item node may be connected to multiple attribute nodes. The online concierge system 102 may select the attribute node that is most likely to lead to a conversion based on a conversion probability output by the query reformulation model 216. In some embodiments, the attribute node may be selected based in part on a value of the connection between an item node and the attribute node. The original search terms entered by the customer and/or the attribute nodes identified by the online concierge system 102 may be input to the query reformulation model 216 in order to generate the reformulated search query.

The online concierge system 102 executes 450 the reformulated search query. The reformulated search query comprises the reformulated search terms. The online concierge system may retrieve the item graph, segment the reformulated search query into tokens, generate combinations of tokens, compare the combinations to the item graph, identify candidate nodes, and score the candidate nodes, as described with reference to steps 410-435.

The online concierge system 102 generates 455 a ranking of candidate item nodes. The online concierge system 102 may rank the candidate item nodes based on the scores determined for the candidate item nodes. The online concierge system 102 may rescore the candidate item nodes based on the reformulated search query. In some embodiments, the online concierge system 102 may refer to the previously calculated scores from the original search query. In various embodiments, the online concierge system 102 generates a ranking of candidate item nodes identified for each combination of tokens from the reformulated search query. The online concierge system 102 may generate the ranking to include candidate item nodes satisfying one or more criteria. For example, the online concierge system 102 selects candidate item nodes having at least a threshold score and generates the ranking from the selected candidate item nodes. In various embodiments, the online concierge system 102 generates 440 the ranking so candidate item nodes with higher scores have higher positions in the ranking.

Based on the ranking, the online concierge system 102 transmits search results for the reformulated search query including one or more of the candidate item nodes to a client device (e.g., a mobile device or a computer displaying the customer mobile application 106) of the customer 104 for display. For example, the online concierge system 102 selects candidate item nodes having at least a threshold position in the ranking and transmits the selected candidate item nodes as the search results. In various embodiments, the online concierge system 102 maintains different threshold positions for different types of items. For example, the online concierge system 102 receives compensation for displaying certain items in search results, and the online concierge system 102 maintains the threshold position for items for which the online concierge system 102 does not receive compensation for displaying, while maintaining an alternative threshold position for items for which the online concierge system 102 receives compensation for displaying. The alternative threshold position may be lower in the ranking than the threshold position in various embodiments. The online concierge system 102 may include a specific number of items (or percentage of items) for which the online concierge system 102 receives compensation for displaying in the search results, so the online concierge system 102 selects the specific number of items for which the online converge system 102 receives compensation for displaying that have at least the threshold position in the ranking, while selecting the remaining items, for which the online concierge system 102 does not receive compensation for displaying, as items having at least the threshold position in the ranking. The search results display the candidate item nodes in an order determined by the ranking in various embodiments. Alternatively, the online converge system 102 selects candidate item nodes having at least a threshold score and displays the selected candidate item nodes as the search results. This allows the online concierge system to provide candidate item nodes more likely to match the search query by accounting for connections between attributes that may match the search query generated from previously received search queries as well as attributes identified for specific products, increasing information that may be evaluated against the received search query.

The displayed results may include the candidate item nodes and the reformulated search query used to select the candidate item nodes. In response to a customer selecting an item node, the online concierge system 102 prompts the customer to order the item corresponding to the item node.

Figure 5:
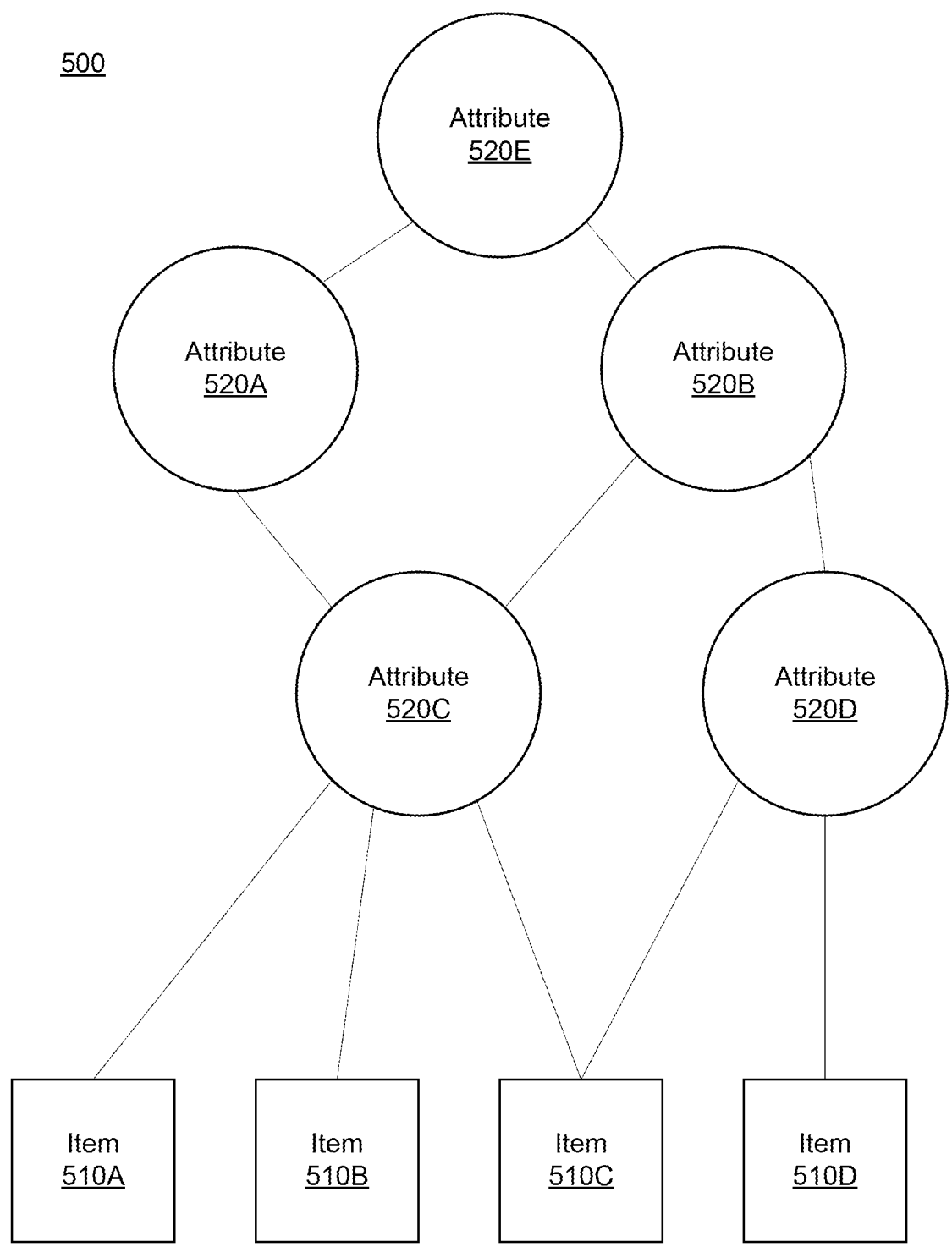
FIG. 5 is an example of an item graph maintained by an online concierge system, according to one embodiment.

FIG. 5 shows an example item graph 500 maintained by the online concierge system 102. The item graph 500 may be an embodiment of the item graphs described with respect to FIG. 2. As further described above in conjunction with FIG. 2 and FIG. 4, the item graph includes item nodes representing items offered by the online concierge system 102 and attribute nodes representing attributes of the items, along with connections between nodes. In the example of FIG. 5, the item graph 500 includes item node 510A, item node 510B, item node 510C, and item node 510D (also referred to individually and collectively using reference number 510). The item graph 500 also includes attribute node 520A, attribute node 520B, attribute node 520C, attribute node 520D, and attribute node 520E (also referred to individually and collectively using reference number 520). In various embodiments, the item graph 500 may comprise large numbers of item nodes, attribute nodes, and hierarchical levels of nodes. However, only a small subset of an item graph is displayed in FIG. 5 for ease of illustration. A connection between an item node 510 and an attribute node 520 in the item graph 500 indicates that the item of item node 510 has the attribute of attribute node 520 based on information about the items obtained by the online concierge system 102. As illustrated, item node 510A is connected to attribute node 520C, indicating that the item of item node 510A has the attribute of attribute node 520C. Similarly, item node 510C is connected to attribute node 520C and attribute node 520D because the item of item node 510C has the attributes of attribute node 520C and attribute node 520D.

Connections between item nodes 510 and attribute nodes 520 are based on information about items obtained by the online concierge system 102. For example, the online concierge system 102 receives a product catalog from a warehouse 110 identifying items offered for purchase by the warehouse 110. Each entry in the product catalog includes information identifying an item and one or more attributes associated with the item. The online concierge system 102 generates the item graph 500 so the item node 510 has a connection to each attribute node 520 associated with the item by the product catalog. Additionally, attributes of an item 510 may be specified by the online concierge system 102, such as one or more categories or descriptions associated with the item by the online concierge system 102, with the item graph 500 establishing connections between the item nodes 510 and attribute nodes for the item specified by the online concierge system 102.

The item graph 500 includes connections between various pairs of nodes. A connection between an item node 510 and an attribute node 520 indicates that the attribute is associated with the item. The item graph 500 are arranged in a hierarchical taxonomy of items. A parent attribute node, such as attribute node 520B, may be connected to one or more child attribute nodes, such as attribute node 520C and attribute 520D, at a lower level of the taxonomy. For example, a "dairy" attribute node may be connected to lower level attribute nodes for "butter," "milk," "eggs," etc. Similarly, attribute node 520C is connected to child item nodes for specific items that contain the attribute. Additionally, a child attribute node or child item node may be connected to one or more parent nodes at a higher level of the taxonomy. As illustrated, attribute node 520C is connected to parent attribute node 520A and parent attribute node 520B. For example, an attribute node for "eggs" may be connected to higher level nodes for "dairy," "baking ingredients," "breakfast items," etc.

The online concierge system 102 generates the item graph 500 based on a product catalog received from the warehouse 110, where each entry in the product catalog includes information identifying an item (e.g., an item identifier, an item name) and one or more attributes of the item. Example attributes of an item include: one or more keywords, a brand offering the item, a manufacturer of the item, a type of the item, and any other suitable information. Additionally, one or more attributes of an item may be specified by the online concierge system 102 for the item. Example attributes specified by the online concierge system 102 for an item include: a category for the item, one or more sub-categories for the item, and any other suitable information for the item. Attributes specified by the online concierge system 102 have corresponding attribute nodes that are connected to an item node for the item in the item graph.

In various embodiments, a connection between nodes in the item graph includes one or more values representing a measure of connectedness between the pair of nodes that are connected. The value included in a connection between nodes is based on based on prior customer actions when ordering items from the online concierge system 102. For example, a value of a connection between an attribute node 520 and an item node 510 may be based on a frequency with which customers purchase the item after entering a search query which is mapped to the attribute node 520. A value of a connection between a first attribute node 520 and a second attribute node 520 may be based on a frequency with which a first item having the first attribute is included in an order by a customer along with a second item having the second attribute. As another example, the value of the connection between the first attribute node 520 and the second attribute node 520 may be based on a number of times a first item having the first attribute is included in an order by a customer along with a second item having the second attribute. In another example, the value of the connection between the first attribute node 520 and the second attribute node 520 is determined from a number of times (or a frequency with which) previously received orders included an item having both the first attribute and the second attribute. The online concierge system 102 modifies the measure of connectedness between nodes in the item graph over time as customers include items connected to various attribute nodes 520 in orders received by the online concierge system 102. This allows the online concierge system 102 to maintain information identifying relationships between different attributes of items as well relationships between attributes and items based on items included in orders previously received by the online concierge system 102 and information about items received by the online concierge system 102.

As illustrated, item node 510C is connected to attribute node 520C and attribute node 520D. A value of the connection between item node 510C and attribute node 520C may be greater than a value of the connection between item node 510C and attribute node 520D. The relative strengths of the connections may affect the probability that a reformulated search query will lead to a conversion. For a search query that identified item node 510C as a candidate item node, a reformulated search query may map to attribute node 520C based in part on the relatively stronger connection between item node 510C and attribute node 520C.

Figure 6:
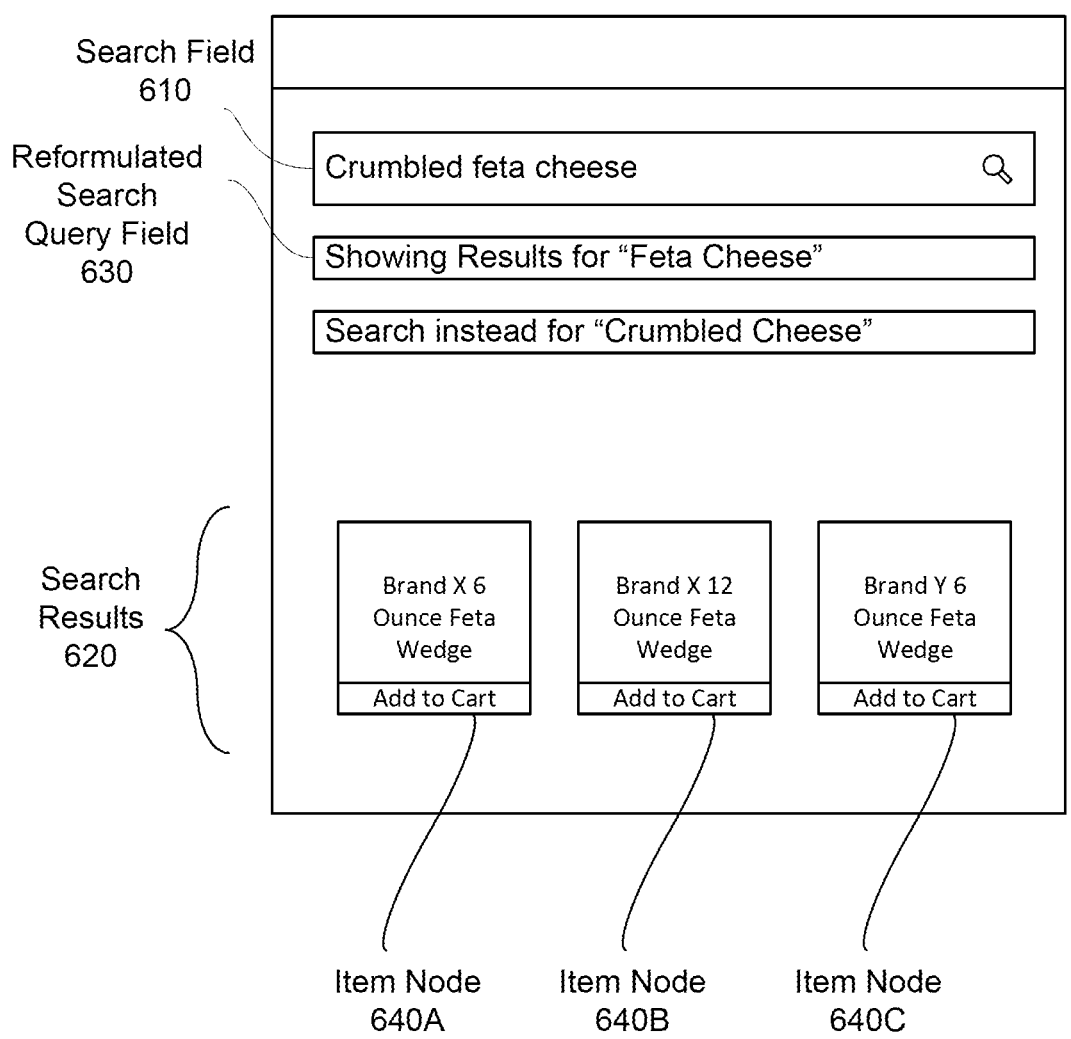
FIG. 6 is an example of an ordering interface for an online concierge system, according to one embodiment.

Referring to FIG. 6A, an example ordering interface 600 including search results is illustrated, according to an embodiment of the invention. The ordering interface 600 includes a search field 610. The customer has entered "Crumbled feta cheese" in the search field 610. The online concierge system 102 executes a search query in an item graph, such as the item graph 500 of FIG. 5, based on the search terms, as previously described with reference to FIG. 4 and FIG. 5. The online concierge system 102 may determine that no candidate item nodes meet presentation criteria for presentation to the customer, and the online concierge system 102 reformulates the search query. The online concierge system 102 may determine that a reformulated search query for "Feta Cheese" may be the most likely reformulated search query to result in a conversion. The online concierge system 102 executes the reformulated search query and transmits the search results to the customer. The search results 620 are displayed on the ordering interface 600. The ordering interface 600 may also display the search terms used in the reformulated search query in a reformulated search query field 630. In some embodiments, the ordering interface 600 may display alternative query formulations which the customer may select to submit an alternative reformulated search query. The search results 620 may be displayed in a grid on the ordering interface 600. As illustrated, the search results 620 are displayed in a 2×3 grid. However, the search results 620 may be displayed in any suitable size grid. The search results 620 may be displayed in a ranked order of conversion probability. The search results 620 represent nodes in the item graph that are likely to lead to a conversion based on the search terms entered by the customer and the reformulated search query. The search results include item nodes 640. For example, the online concierge system 102 may tokenize the reformulated search terms and map the tokens to the item graph. The tokens may map to an attribute node for feta cheese, and the online concierge system may select item nodes at one or more taxonomy levels below the attribute node. An item node 640A allows the customer to purchase a Brand X 6 ounce wedge of feta; an item node 640B allows the customer to purchase a Brand X 12 ounce wedge of feta; and an item node 640C allows the customer to purchase a Brand Y 6 ounce wedge of feta.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, performed at a computer system comprising a processor and a computer-readable medium, comprising:
   receiving a search query including one or more search terms from a customer via a user interface of the computer system;
   retrieving an item graph comprising item nodes and attribute nodes, wherein the item graph is a database of records arranged as a graph database, and each attribute node is connected to a set of item nodes that share an attribute represented by the attribute node;
   identifying candidate nodes from the item graph by comparing the search terms to the item graph;
   in response to determining that none of the identified candidate nodes meet presentation criteria, reformulating the search query by applying a query reformulation model to the one or more search terms, wherein the query reformulation model is trained with a dataset including the search terms entered by the customer, subsequent search terms entered by customers, and labels indicating whether the subsequent search terms resulted in a conversion, and wherein reformulating the search query comprises:
      generating one or more reformulated search queries, each reformulated search query including a set of reformulated search terms,
      calculating a conversion probability for at least one reformulated search query, and
      selecting a reformulated search query based on the calculated conversion probability;
   selecting search results from the item graph comprising one or more item nodes based on the selected reformulated search query; and
   transmitting the search results to a customer device.

2. The method of claim 1, further comprising transmitting the reformulated search query to the customer device.

3. The method of claim 1, further comprising executing a new search query based on the reformulated search query.

4. The method of claim 1, wherein the reformulated search query is broader than the search query received from the customer.

5. The method of claim 1, wherein the presentation criteria comprise a minimum score for one of the identified candidate nodes.

6. The method of claim 1, further comprising generating a score for each of the identified candidate nodes.

7. The method of claim 1, wherein selecting a reformulated search query based on the calculated conversion probability comprises:
   determining that the reformulated search query comprises a higher conversion probability than a conversion probability of the search query received from the customer.

8. A computer program product comprising a non-transitory computer readable storage medium having instructions encoded thereon that, when executed by a processor, cause the processor to:
   receive a search query including one or more search terms from a customer via a user interface;

retrieve an item graph comprising item nodes and attribute nodes, wherein the item graph is a database of records arranged as a graph database, and each attribute node is connected to a set of item nodes that share an attribute represented by the attribute node;

identify candidate nodes from the item graph by comparing the search terms to the item graph;

in response to determining that none of the identified candidate nodes meet presentation criteria, reformulate the search query by applying a query reformulation model to the one or more search terms, wherein the query reformulation model is trained with a dataset including the search terms entered by the customer, subsequent search terms entered by customers, and labels indicating whether the subsequent search terms resulted in a conversion, and wherein reformulating the search query comprises:

generating one or more reformulated search queries, each reformulated search query including a set of reformulated search terms, calculating a conversion probability for at least one reformulated search query, and selecting a reformulated search query based on the calculated conversion probability;

select search results from the item graph comprising one or more item nodes based on the selected reformulated search query; and transmit the search results to a customer device.

9. The computer program product of claim 8, wherein the instructions further cause the processor to: transmit the reformulated search query to the customer device.

10. The computer program product of claim 8, wherein the instructions further cause the processor to: execute a new search query based on the reformulated search query.

11. The computer program product of claim 8, wherein the reformulated search query is broader than the search query received from the customer.

12. The computer program product of claim 8, wherein the presentation criteria comprise a minimum score for one of the identified candidate nodes.

13. The computer program product of claim 8, wherein the instructions further cause the processor to: generate a score for each of the identified candidate nodes.

14. The computer program product of claim 8, wherein the instructions to select a reformulated search query based on the calculated conversion probability further cause the processor to:

determining that the reformulated search query comprises a higher conversion probability than a conversion probability of the search query received from the customer.

15. A computer system comprising:

a processor; and a non-transitory computer-readable storage medium having instructions that, when executed by the processor, cause the computer system to:

receive a search query including one or more search terms from a customer via a user interface of the computer system;

retrieve an item graph comprising item nodes and attribute nodes, wherein the item graph is a database of records arranged as a graph database, and each attribute node is connected to a set of item nodes that share an attribute represented by the attribute node;

identify candidate nodes from the item graph by comparing the search terms to the item graph;

in response to determining that none of the identified candidate nodes meet presentation criteria, reformulate the search query by applying a query reformulation model to the one or more search terms, wherein the query reformulation model is trained with a dataset including the search terms entered by the customer, subsequent search terms entered by customers, and labels indicating whether the subsequent search terms resulted in a conversion, and wherein reformulating the search query comprises:

generating one or more reformulated search queries, each reformulated search query including a set of reformulated search terms, calculating a conversion probability for at least one reformulated search query, and selecting a reformulated search query based on the calculated conversion probability;

select search results from the item graph comprising one or more item nodes based on the selected reformulated search query; and transmit the search results to a customer device.

16. The system of claim 15, wherein the instructions further cause the computer system to:

transmit the reformulated search query to the customer device.

17. The system of claim 15, wherein the instructions further cause the computer system to:

execute a new search query based on the reformulated search query.

18. The system of claim 15, wherein the reformulated search query is broader than the search query received from the customer.

19. The system of claim 15, wherein the presentation criteria comprise a minimum score for one of the identified candidate nodes.

20. The system of claim 15, wherein the instructions further cause the computer system to:

generate a score for each of the identified candidate nodes.

* * * * *